Jan. 3, 1928. 1,655,348
O. H. WESTER
APPARATUS FOR CUTTING TUBULAR ARTICLES INTO PREDETERMINED LENGTHS
Filed Oct. 26, 1926
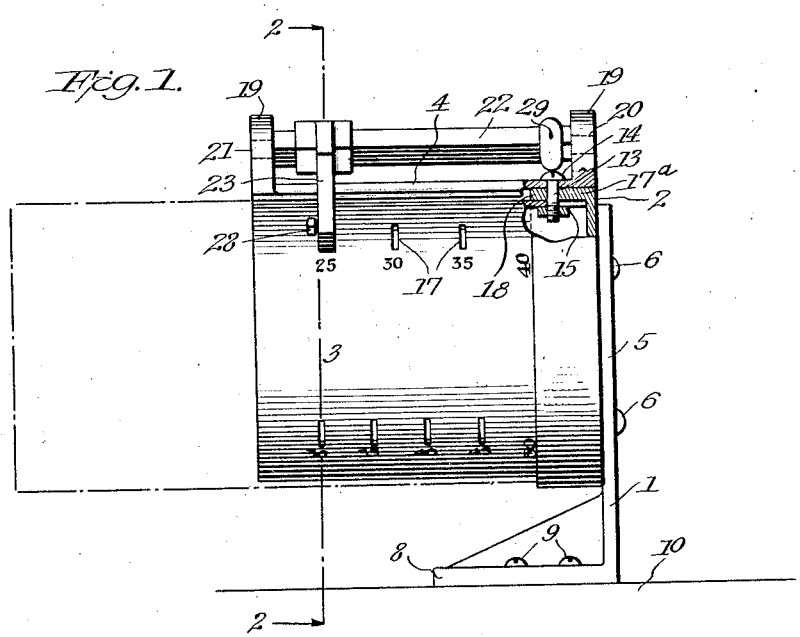
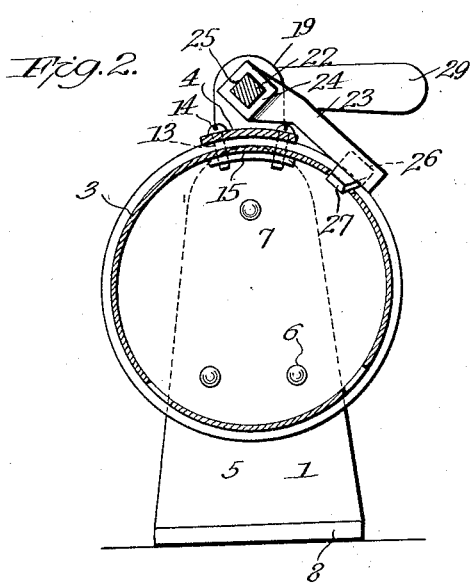
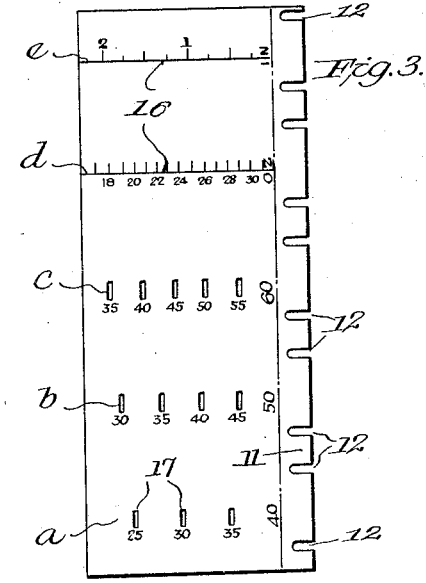
Inventor
Otto H. Wester
By
Attorney Patented Jan. 3, 1928.

1,655,348

UNITED STATES PATENT OFFICE.

OTTO H. WESTER, OF NEWTON, KANSAS.

APPARATUS FOR CUTTING TUBULAR ARTICLES INTO PREDETERMINED LENGTHS.

Application filed October 26, 1926. Serial No. 144,350.

This invention relates to apparatus for cutting tubular articles into predetermined lengths.

The primary object of the invention is to provide a simple, easily operated cutting apparatus whereby a tubular box of standard or known size can be quickly cut down to any desired predetermined smaller size by an unskilled person.

A further and more specific object of the invention is the provision of a cutting apparatus capable of easy mounting upon a counter or the like whereby a salesman of ice cream or similar commodities may quickly cut down a container of standard or known size so that it will hold, exactly, any predetermined amount of the commodity desired by a customer.

A still further object of the invention is the provision of a cutting apparatus whereby sections of any predetermined length may be quickly and accurately cut from a stock of tubular material.

With these and other objects in view, as will become apparent as the description proceeds, the invention consists of the novel features of construction, combinations of elements and arrangements of parts hereinafter to be fully described and pointed out in the claims.

A full and complete understanding of the invention may be obtained from a consideration of the following detailed description, taken in connection with the accompanying drawing forming a part of the disclosure, it being understood that while the drawing shows a single embodiment of the invention which has proven satisfactory in practice, the latter is not confined to the showing thereof, but may be changed or modified so long as such changes and modifications mark no material departure from the salient features of the invention as hereinafter fully described and claimed.

In these drawings:

Figure 1 is a view in side elevation of a cutting apparatus, embodying the features of my invention, having a conventional ice cream container mounted thereon in position ready to be cut; a portion of the structure being broken away to disclose certain details of the construction in section;

Fig. 2 is a vertical section view taken on line 2—2 of Fig. 1; and

Fig. 3 is an opened out plan view, somewhat diminished in size, of the cylinder of the apparatus.

In the vending of ice cream and similar commodities, it is customary to provide the salesman with a supply of containers of the quart, pint and, in some instances, half-pint sizes. A large percentage of the sales of ice cream, however, are of quantities more than a half-pint and less than a pint, or more than a pint and less than a quart, and in making such sales the salesman must use a container too large for the desired quantity and must guess as to the amount of the commodity put into the container. My inventive-concept obviates this difficulty, as by the use of the apparatus herein disclosed, an unskilled salesman is able to quickly cut down the container to such a size that it will hold just the desired quantity.

The embodiment of the invention illustrated in the accompanying drawings is especially adapted for cutting down the well-known "Sealright" containers of the quart and pint sizes to any desired smaller size, and comprises a supporting standard or bracket 1; a cylindrical cap member 2 rigidly secured to the standard 1; a cylindrical body 3 fitting within and adapted to be secured in any of a plurality of positions to the cap member; and a cutter-supporting plate 4 fast at one of its ends to the cap 2 and extending in spaced parallel relation to the body 3.

Preferably and as shown, the supporting standard 1 is L shaped and comprises a vertical arm 5 rigidly secured, as by bolts or rivets 6, to the closed end 7 of the cap member 2, and a horizontal arm 8 adapted to be secured, as by screws 9, to a counter top or other supporting surface 10.

The cylindrical body 3 may be either cast or formed up of sheet metal and may be made of any desired length, depending upon the length of tubes or containers to be cut. Extending inwardly from one end of the body 3 are a plurality of pairs 11 of slots 12, each pair of which serves, when in engagement with a pair of machine screws or bolts 13 which secure the cap, body and cutter-supporting plate in assembled relation, to maintain the body in a predetermined position with respect to the cutter-supporting plate. The bolts 13, having slotted heads 14 for manipulation thereof, pass through the plate 4, cap 2 and body 3 and have screw-threaded engagement with an arcuate keeper plate 15 disposed within the body. By this construction, the body may be selectively secured in any one of a plurality of positions, depending upon which pair 11 of slots 12 is traversed by the bolts 13, by merely loosening the bolts 13, withdrawing the body 3 from the cap until the bolts 13 are free of the slots 12, rotating the body until the desired pair of slots register with the bolts, pushing the slotted end of the body fully into the cap, and tightening the bolts 13.

As shown, five longitudinally extending scales 16 are marked upon the outer surface of the body 12 in spaced relation to each other, one ($a$) graduated to indicate prices for the commodity when it sells at 40 cents a quart, another ($b$) graduated to indicate prices for the commodity when it sells at 50 cents a quart, another ($c$) graduated to indicate prices when the commodity sells at 60 cents a quart, another ($d$) graduated in ounces, and another ($e$) graduated in inches. At the major divisions of each of these scales, the body 3 is transversely slotted, as at 17, for a purpose to be hereinafter explained, and the scales are so located with respect to the pairs 11 of slots 12 that in each position of the body one of the scales is disposed in operative position adjacent to and in alinement with the cutter-supporting plate 4. When the body 3 and cap 2 are assembled, the flange or cylindrical portion 17$^a$ of the cap serves as a hand-hold and its edge 18 constitutes a guiding shoulder against which the end of the tube or box to be cut abuts during the cutting operation.

Preferably and as shown, the plate 4 is transversely curved to conform to the outer surface of the tube or box to be cut and is provided at each of its ends with an upstanding projection 19 having centrally thereof a bearing 20 for the reception of a rounded end 21 of a cutter-supporting shaft or bar 22 extending between the projections 19. The shaft, except for the end portions 21, is preferably square and has slidably mounted thereon a blade holding arm 23 which extends radially therefrom. As shown, this arm includes an enlarged base portion 24 apertured as at 25 to receive and snugly fit the central square portion of the shaft 22 and is slotted adjacent its outer end, as at 26, to receive a knife or blade 27 which may be removably held in position by a set screw 28. Obviously, a spring or a set screw (not shown) may be employed to cause the arm 23 to stay in any position in which it is put, with respect to the shaft 22, without preventing its sliding movement thereon when desired.

The knife 27 is sharpened along one edge, so that movement of the container to be cut thereagainst will cause the latter to be severed. A handle 29, fast to the shaft 22 adjacent one end thereof, is provided for rotating the shaft and for applying the necessary pressure to maintain the blade-holding arm 23 in operative position during the cutting operation.

In order that the modus operandi of the apparatus may be clear, it will be assumed that ice cream is selling at 40 cents per quart and a customer desires to purchase 25 cents worth of ice cream. The salesman first moves the arm 23 along the shaft 22 until the knife 27 drops into the slot 17 at the 25-cent point of scale $a$ and then, by means of the handle 29, rotates the shaft so as to raise the free end of arm 23. A quart container is then slipped onto the body 3 until its open end abuts the shoulder 18, whereupon the blade is again lowered into the slot 17 (as shown in Fig. 1) and is held in that position while the container is rotated one revolution on the body, against the knife, which cuts the container down so that it will hold exactly 25 cents worth of the commodity.

If the price of the commodity changes, or the device is to be used for another purpose, such as cutting tubes to predetermined length, it is only necessary to rotate the cylinder to bring the proper scale into operative position, as hereinbefore described. It is desirable, but not essential, that a support for the apparatus be provided or employed as the cap can readily be held in one hand while the other hand of the salesman is rotating the container or setting the cutting instrumentalities.

What I claim is:

1. A device of the character described comprising a supporting bracket, a cylindrical cap member fast to the bracket, a tube supporting cylinder carried by the cap and capable of fixed association therewith in a plurality of positions, the cylinder being formed with a plurality of rows of transverse slots, each row of slots constituting a scale and disposed in operative position in one position of the cylinder, a cutter-supporting plate fast at one of its ends to the cap and extending in spaced parallel relation to the cylinder, a cutter-supporting shaft rotatably carried by the plate in axial alinement with the cylinder, a blade-holding arm slidably but non-rotatably mounted on said shaft, a blade carried by the blade-holding arm and selectively positionable in any of the slots of the scale in operative position, and a handle fast to and extending radially from the shaft for manipulation thereof.

2. A device of the character described comprising a supporting bracket, a cylindrical cap member fast to the bracket, a tube-supporting cylinder carried by the cap and formed with a row of transverse slots constituting a scale, a cutter-supporting plate fast at one of its ends to the cap and extending in spaced parallel relation to the cylinder, a cutter-supporting shaft rotatably carried by the plate in axial alinement with the cylinder, a blade-holding arm slidably but non-rotatably mounted on the shaft, and a blade carried by the blade-holding arm and selectively positionable in any of the slots of the scale.

3. A device of the character described comprising a supporting bracket, a cylindrical cap member fast to the bracket, a tube-supporting cylinder carried by the cap and formed with a row of transverse slots constituting a scale, a cutter-supporting plate fast at one of its ends to the cap and extending in spaced parallel relation to the cylinder, a cutter-supporting shaft rotatably carried by the plate in axial alinement with the cylinder, a blade-holding arm slidable but non-rotatably mounted on the shaft, a blade carried by the blade-holding arm and selectively positionable in any of the slots of the scale, and a handle fast to and extending radially from the shaft for manipulation thereof.

4. Apparatus for cutting down containers of standard size to predetermined smaller sizes, comprising a cylindrical cap member, a container-supporting cylinder fitting partially within and secured to the cap member and having a scale thereon extending from the end of the cap to the end of the cylinder, and a cutting instrumentality associated with the cap and cylinder and including a blade-holder and a blade carried thereby so arranged that the position of the blade with respect to the longitudinal axis of the cylinder may be accurately set by means of the scale, a standard container may be fitted upon the cylinder with its open end in the plane of the end of the cap member, the blade may be moved into cutting engagement with the container without altering the setting thereof, and the container may be rotated upon the cylinder into action thereon by the blade to sever a predetermined portion therefrom.

5. Apparatus of the character described comprising a cap member, a cylinder fast to and extending from the cap member, and a container-cutting instrumentality fast to the cap member and including a blade and means whereby the blade may be moved to and held in such position that one revolution of a container mounted on the cylinder will sever a predetermined portion therefrom.

6. An apparatus of the character described comprising a cap member, a container-supporting member fast to and extending therefrom and formed with a row of spaced transverse slots constituting a scale, and a cutting instrumentality associated with the cap and cylinder and including a blade selectively positionable in the slots.

7. An apparatus of the character described including a cap member, a container-supporting member formed with a plurality of spaced pairs of slots extending inwardly from an end thereof, a keeper member within the cap, and a pair of machine screws traversing the cap and engaging the keeper member and adapted to engage selectively with the pairs of slots in the container-supporting member to maintain the latter in fixed relation to the cap member.

8. An apparatus of the character described including a cap member, a container-supporting member formed with a plurality of spaced pairs of slots extending inwardly from an end thereof and with a plurality of rows of transverse slots constituting scales, a keeper member within the cap, and a pair of machine screws traversing the cap and engaging the keeper member and adapted to engage selectively with the pairs of slots in the container-supporting member to maintain the latter in fixed relation to the cap member.

9. An apparatus of the character described including a cap member, a container-supporting member formed with a plurality of spaced pairs of slots extending inwardly from an end thereof and with a plurality of rows of transverse slots constituting scales, a keeper member within the cap, a pair of machine screws traversing the cap and engaging the keeper member and adapted to engage selectively with the pairs of slots in the container-supporting member to maintain the latter in fixed relation to the cap member, and a container-cutting instrumentality maintained in fixed relation to the cap by said machine screws.

10. An apparatus of the character described including a cap member, a container-supporting member formed with a plurality of spaced pairs of slots extending inwardly from an end thereof and with a plurality of rows of transverse slots constituting scales, a keeper member within the cap, and a pair of machine screws traversing the cap and engaging the keeper member and adapted to engage selectively with the pairs of slots in the container-supporting member to maintain the latter in fixed relation to the cap member, each bearing a definite relation to one of said pairs of slots.

11. An apparatus of the character described including a cap member, a container-supporting member formed with a plurality of spaced pairs of slots extending inwardly from an end thereof and with a plurality of rows of transverse slots constituting scales, a keeper member within the cap and a pair of machine screws traversing the cap and engaging the keeper member and adapted to engage selectively with the pairs of slots in the container-supporting member to maintain the latter in fixed relation to the cap member, each bearing a definite relation to one of said pairs of slots and including a blade selectively positionable in any of the slots in one of the scales.

12. An apparatus of the character described comprising a supporting standard, a cap member fast thereto, a container-support carried by the cap member, an arcuate plate fast to the cap and extending in spaced alinement with the container support, a pair of integral projections upstanding from the ends of the plate, bearings in the projections, a shaft journaled in the bearings, a blade-holder slidably but non-rotatably mounted on the shaft, a blade carried by the blade-holder, and a handle fast to the shaft for moving the blade into and holding it in operative position to cut a container mounted on the container-support when the container is rotated thereon.

13. An apparatus of the character described comprising a container-supporting member, and a container-cutting instrumentality carried by the member and including a blade selectively positionable in a plurality of positions in cutting relation to a container mounted on said member.

14. An apparatus of the character described comprising a container-supporting member, and a container-cutting instrumentality carried by the member and including a blade selectively positionable in a plurality of positions in cutting relation to a container mounted on said member, whereby any desired portion of the container may be cut off by rotating the container once upon the member.

15. An apparatus of the class described comprising a container-supporting member formed with a row of spaced transverse slots constituting a scale, and a cutting instrumentality carried by the member and including a blade selectively positionable in the slots.

16. An apparatus of the character described including a cap-member, a container-supporting member formed with a plurality of spaced slots extending inwardly from an end thereof, a keeper-member within the cap, and means traversing the cap and engaging the keeper-member and adapted to engage selectively with the slots in the container-supporting member to maintain the latter in fixed relation to the cap-member.

In testimony whereof I affix my signature.

OTTO H. WESTER.